D. R. WILLIAMS.
SAW TOOL.
APPLICATION FILED DEC. 2, 1907. RENEWED JULY 15, 1911.
1,004,326.
Patented Sept. 26, 1911.
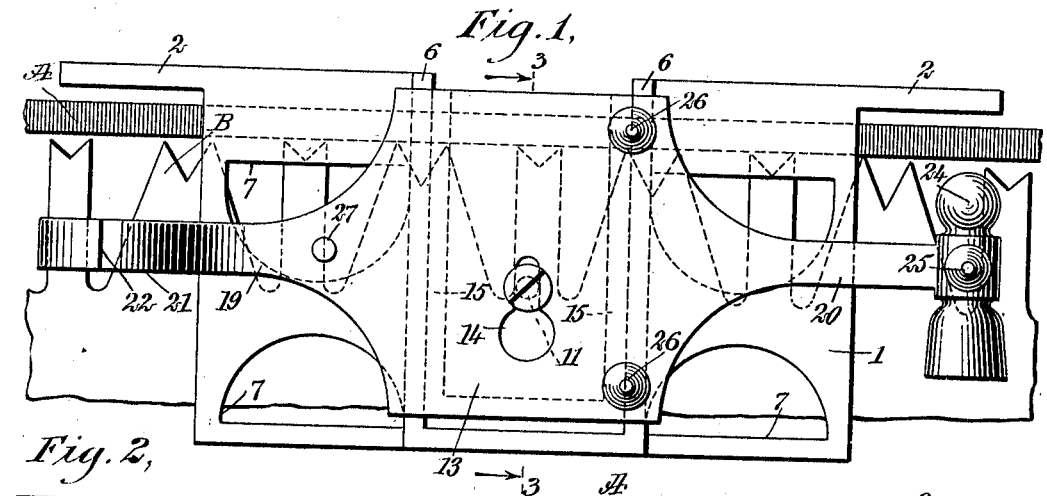
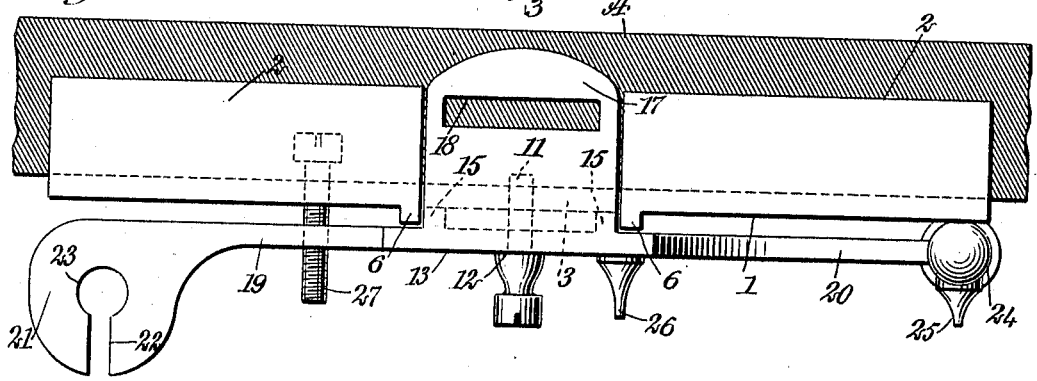
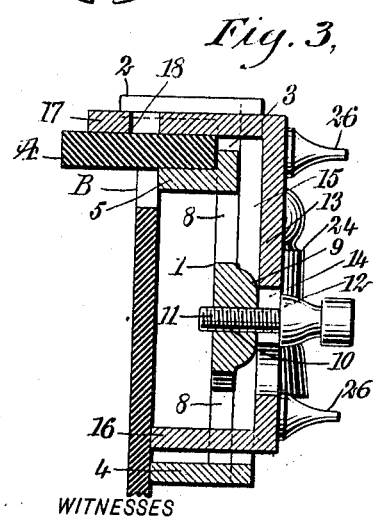
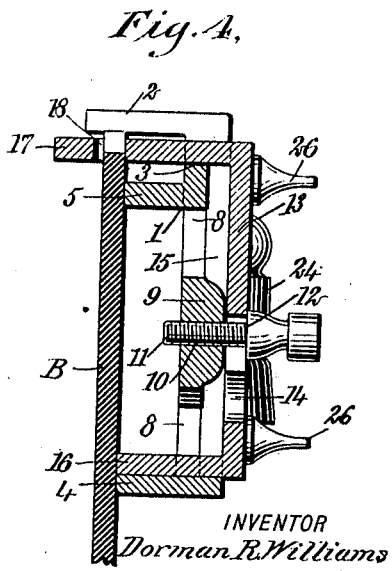
WITNESSES
Edward Thorpe.
John K. Brackerget
INVENTOR
Dorman R. Williams
BY Munn & Co.
ATTORNEYS

UNITED STATES PATENT OFFICE.

DORMAN ROSS WILLIAMS, OF WHITTEMORE, MICHIGAN.

SAW-TOOL.

1,004,326.  Specification of Letters Patent.  Patented Sept. 26, 1911.

Application filed December 2, 1907, Serial No. 404,649. Renewed July 15, 1911. Serial No. 638,712.

*To all whom it may concern:*

Be it known that I, DORMAN ROSS WILLIAMS, a citizen of the United States, and a resident of Whittemore, in the county of Iosco and State of Michigan, have invented a new and Improved Saw-Tool, of which the following is a full, clear, and exact description.

This invention relates to saw tools, and is particularly useful in connection with saws having cleaner or raker teeth.

An object of the invention is to provide a simple, inexpensive and efficient saw tool, by means of which the jointing or alining of the teeth of a saw can be effected rapidly and easily, and by means of which the cleaner or raker teeth of a saw can be filed down uniformly to any desired point.

A further object of the invention is to provide a device of the class described, by means of which saw teeth can be easily and rapidly set or swaged, and which includes a gage for determining the set or swage of the saw teeth.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a side elevation of my invention, showing the same applied to a saw blade for the purpose of jointing the teeth; Fig. 2 is a plan view of the device, showing a file held by the tool in jointing the saw teeth; Fig. 3 is a transverse section on the line 3—3 of Fig. 1; and Fig. 4 is a view similar to Fig. 3, showing the tool applied to a saw, for the purpose of filing down the cleaner teeth.

Before proceeding to a more detailed explanation of my invention, it should be clearly understood that my saw tool, while particularly useful in connection with saws having cleaner or raker teeth, can also be advantageously employed in jointing, setting and gaging saws of different types. Certain saws are provided with cutting teeth and teeth which clean the groove formed by the cutting teeth as the saw travels within the groove. These cleaner or raker teeth do not project as far as the cutting teeth. It is, of course, necessary to have all the cleaner teeth of the same length, and my invention permits the filing down and sharpening of the cleaner teeth to a uniform degree. Furthermore, the teeth of certain saws must be laterally twisted or bent alternately in opposite directions; this is called setting or swaging. It is essential to the efficient operation of the saw that the set of all the teeth be uniform. By means of my invention, the teeth can be set easily and rapidly and at the same time the degree of the set can be gaged to insure the uniform bending of the teeth.

Referring more particularly to the drawings, I provide a body 1, comprising a flat blade formed from any suitable material, such as steel, iron or the like, and having at the upper edge two similar laterally disposed frames 2 at substantially right angles with the body 1. The frames 2 are separated near the middle of the body, which is provided with a recess 3 at the upper edge between the frames 2. At the lower edge, the body 1 has a lateral flange 4 disposed in the same direction as the frame 2 but not projecting so far as the latter. Near the upper edge, underneath the frames 2, the body has a further flange 5 parallel to the flange 4 and extending from the body 1 a distance substantially equal to the extension of the flange 4. The frames 2 extend beyond the ends of the body 1 and are adapted to project over the teeth of the saw when the device is arranged against a side of the saw blade, as is shown most clearly in Figs. 3 and 4. When the device is so positioned, the flanges 4 and 5 engage the saw blade and maintain the body in position with respect to the saw blade.

Near the center, at the outer side of the body 1, are parallel and separated guides 6 for a purpose which will appear hereinafter. The material of the body at the outer sides of the guides and between the same is cut away to form openings 7 and 8 respectively, to decrease the weight of the tool and the quantity of material necessary in its manufacture. Between the guides 6 is arranged a projecting boss 9 having a threaded opening 10 therethrough, in which is removably arranged a set screw 11, having a shoulder 12. A member 13 is removably arranged upon the body and has a key-hole slot 14 adapted to co-act with the said screw 12 to permit the arrangement of the member upon the body.

The member 13 has ribs 15 adapted to be arranged at the inner sides of the guides 6 and to engage the latter to hold the member upon the body secure against lateral displacement. At the lower edge, the member has a lateral extension 16 adapted to project through an opening 8 of the body between the guides 6. Near the upper edge, the member has a second extension 17 adapted to project over the flange 5 through the recess 3 of the body, as is shown most clearly in Figs. 3 and 4. The extension 17 has a transverse slot 18.

When it is desired to joint the teeth of a saw B, that is, file them down to a uniform level, a file A is arranged between the flange 5 of the body and the frames 2. The extension 17 of the member engages at the upper face of the file and by forcing the member downward, is operated to clamp the file between the extension 17 and the flange 5. By means of the set screw 11, the member can be secured in position upon the body to clamp the file. When the tool is then arranged at a side of the saw blade with the flanges 4 and 5 engaging the same, the file is disposed at the points of the teeth, and by moving the tool longitudinally of the saw blade, the saw teeth points can be readily and uniformly filed down.

In filing down the cleaner teeth, the member 13 is adjusted by means of the set screw so that the upper face of the extension 17 is arranged below the under faces of the frames 2, a distance equal to the distance it is required to file down the cleaner teeth. The tool is then arranged at the side of the saw blade with the frames engaging the points of the cutting teeth, one or more of the cleaner teeth being allowed to extend through the slot 18 of the extension 17. The projecting points of the cleaner teeth can then be filed down until they are flush with the upper face of the extension 17; that is, until they have been shortened the required amount.

At opposite ends, the member is formed into arms 19 and 20 respectively. The arm 19 has a flattened head 21 lying in a plane at substantially right angles with the plane of the member, and provided with a notch 22 extending inwardly from the edge of the head. At the inner end, the notch 22 has an extended portion 23. By means of the notched head 21, the saw teeth can be set or swaged. Each tooth in turn is inserted in the notch, and a lateral pressure upon the member bends the tooth to one side or the other out of the plane of the saw blade. The arm 20 of the member at the end is provided with a hammer head 24, which may be of any preferred or common form, and by means of which the saw teeth may be set or swaged in the usual manner; that is, by striking with a hammer.

The hammer head 24 is provided with a stud 25 projecting laterally at the side of the head. Similar studs 26 are carried by the member intermediate of the arms 19 and 20. The studs 26 and the stud 25 project equal distances from the member and have the points arranged in one plane. At a point remote from the stud, the body has a threaded opening therethrough, in which is arranged a gage screw 27, by means of which the set or swage of the saw teeth can be determined or controlled. By arranging the member with the stud points engaging a face of the saw blade, the lateral bend of a saw tooth can be determined by means of the gage screw, which can be adjusted to any desired set.

Having thus described my invention, I claim as new and desire to secure by Letters Patent.

1. In a device of the class described, a body formed to engage a saw blade and having a lateral flange at its lower edge and a lateral flange near the upper edge, the said flanges serving to maintain the body substantially parallel with the blade, said body having a recess at the upper edge thereof and substantially parallel guides at each side of said recess and extending transversely of the length of said body, a member removably mounted upon said body and having ribs slidably engaging between said guides, the said member having a lateral extension at its lower edge adapted to project through an opening in the body between the guides, the said member having a second extension at its upper end adapted to extend through the recess in the body and project over the said flange near the upper end of the body, and means for holding said member in position upon said body.

2. In a device of the class described, a body formed to engage a saw blade and having lateral flanges serving to maintain the body substantially parallel to the blade, said body having guides and between said guides a set screw presenting a shoulder, and a member slidably carried by said body and having ribs engaging at the inner sides of said guides, said member having a key-hole slot adapted to co-act with said set screw to hold said member in position upon said body, said member further having a lateral extension adapted to co-act with one of said flanges of said body to hold a jointing tool in position.

3. In a device of the class described, a body formed to engage a saw blade, having at the upper and lower edges lateral flanges serving to maintain the body substantially parallel to the blade, said body having a recess at the upper edge thereof, and having guides at each side of said recess, said guides extending transversely of the length of said body, said body having, further, between said guides, a set screw presenting a shoulder, and a member slidably carried by said body and having ribs engaging respectively at the inner sides of said guides, said member having a key-hole slot adapted to co-act with said set screw to hold said member in position on said body, said member further having a lateral extension adapted to co-act with one of said flanges of said body, to hold a jointing tool in position, said extension also being provided with an opening therethrough and adapted to be received by said recess of said body, said extension serving to limit the filing of the saw teeth.

In testimony whereof I have signed my name to this specification in the presence of two subscribing witnesses.

DORMAN ROSS WILLIAMS.

Witnesses:
L. A CHICHESTER,
MAE GORSUCH.

Copies of this patent may be obtained for five cents each, by addressing the "Commissioner of Patents, Washington, D. C."